US 9,705,685 B2

(12) United States Patent
Yamada et al.

(10) Patent No.: US 9,705,685 B2
(45) Date of Patent: Jul. 11, 2017

(54) CHARGING CONTROL METHOD AND SYSTEM IN COMMUNICATION NETWORK

(71) Applicant: NEC Corporation, Tokyo (JP)

(72) Inventors: Yoshiyuki Yamada, Tokyo (JP); Makoto Fujinami, Tokyo (JP); Ippei Akiyoshi, Tokyo (JP); Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 20 days.

(21) Appl. No.: 14/429,344

(22) PCT Filed: Sep. 20, 2013

(86) PCT No.: PCT/JP2013/005546
§ 371 (c)(1),
(2) Date: Mar. 18, 2015

(87) PCT Pub. No.: WO2014/045587
PCT Pub. Date: Mar. 27, 2014

(65) Prior Publication Data
US 2015/0280926 A1    Oct. 1, 2015

(30) Foreign Application Priority Data

Sep. 20, 2012  (JP) ................................ 2012-207620

(51) Int. Cl.
*H04L 12/14*     (2006.01)
*H04M 15/00*     (2006.01)
(Continued)

(52) U.S. Cl.
CPC ........... *H04L 12/1407* (2013.01); *H04W 4/24* (2013.01); *H04W 88/182* (2013.01); *H04B 7/14* (2013.01);
(Continued)

(58) Field of Classification Search
CPC ....... H04B 7/14; H04L 12/14–12/1407; H04L 47/20; H04L 67/2833; H04M 15/31;
(Continued)

(56) References Cited

U.S. PATENT DOCUMENTS

2002/0052798 A1    5/2002  Nishikado et al.
2011/0165901 A1    7/2011  Baniel et al.
(Continued)

FOREIGN PATENT DOCUMENTS

CN        1496155 A       5/2004
JP     2002-140309 A      5/2002
(Continued)

OTHER PUBLICATIONS

Extended European Search Report mailed Apr. 25, 2016, by the European Patent Office in counterpart European Patent Application No. 13839966.2.
International Search Report (ISR) (PCT Form PCT/ISA/210), in PCT/JP2013/005546, dated Nov. 19, 2013.
3GPP TS23.203 v11.6.0 (Jun. 2012).
Chinese Office Action dated Dec. 30, 2015 with an English translation thereof.

*Primary Examiner* — Timothy J Weidner
(74) *Attorney, Agent, or Firm* — Finnegan, Henderson, Farabow, Garrett & Dunner, L.L.P.

(57) ABSTRACT

A charging control method and system are provided that can reduce the processing load on a function of performing charging control. The charging control system includes a policy and charging rules function (PCRF), a plurality of gateways (P-GWs) each including a policy and charging enforcement function (PCEF), and a relay section including a relay server and a switch that connects the PCRF and the plurality of PCEFs in a hierarchical manner. The PCRF is directly connected to the relay section, whereby the number of sessions is reduced.

17 Claims, 12 Drawing Sheets

(51) Int. Cl.
  *H04W 4/24* (2009.01)
  *H04W 88/18* (2009.01)
  *H04B 7/14* (2006.01)
  *H04W 88/08* (2009.01)
  *H04W 88/16* (2009.01)
  *H04L 29/08* (2006.01)

(52) U.S. Cl.
  CPC ......... *H04L 67/2833* (2013.01); *H04M 15/66* (2013.01); *H04M 2215/208* (2013.01); *H04W 88/08* (2013.01); *H04W 88/16* (2013.01)

(58) Field of Classification Search
  CPC ............... H04M 15/66; H04M 15/857; H04W 4/24–4/26; H04W 88/005; H04W 88/08–88/10; H04W 88/16; H04W 88/182; H04W 92/06
  See application file for complete search history.

(56) References Cited

U.S. PATENT DOCUMENTS

| | | | |
|---|---|---|---|
| 2012/0099715 A1* | 4/2012 | Ravishankar | H04L 12/1407 379/114.01 |
| 2013/0166746 A1* | 6/2013 | Andreasen | H04L 41/0893 709/225 |
| 2014/0153504 A1* | 6/2014 | Wang | H04W 28/14 370/329 |

FOREIGN PATENT DOCUMENTS

| | | |
|---|---|---|
| JP | 2008-098714 A | 4/2008 |
| JP | 2008-98714 A | 4/2008 |
| JP | 2009-188961 A | 8/2009 |
| WO | WO 2012/110862 A1 | 8/2012 |

* cited by examiner

FIG. 7 FOURTH EXEMPLARY EMBODIMENT

CHARGING CONTROL METHOD AND SYSTEM IN COMMUNICATION NETWORK

TECHNICAL FIELD

The present invention relates to charging control in a communication network and, more particularly, to a charging control method and system for reducing the load on a charge control function.

BACKGROUND ART

Charging control in LTE (Long Term Evolution) is performed by a policy and charging rules function (PCRF) and a policy and charging enforcement function (PCEF) that is provided in a PDN gateway (P-GW: Packet data network Gateway) for connecting to an external packet data network (NPL 1).

For example, as shown in FIG. 1, a PCRF in a mobile core network determines policy information and charging rules to apply to user packets, and PCEFs in a plurality of P-GWs notify the numbers of packets, which are counted by them individually, to the PCRF as information for charging.

Moreover, in a communication system disclosed in PTL 1, a call connection method is adopted for reducing the load on a PCRF server. That is, a selector PCRF server and a plurality of provider PCRF servers are provided, and the selector PCRF server sends a resource request to each of respective provider PCRF servers on a caller side and a callee side, thereby reducing load.

[PTL 1] Japanese Patent Application Unexamined Publication No. 2009-188961
[NPL 1] 3GPP TS23.203 v11.6.0 (2012-06)

SUMMARY

Technical Problem

However, the charging control system as shown in FIG. 1 has the problem that as the number of P-GWs increases, the number of sessions created between the PCRF and PCEFs also grows, resulting in the load on the PCRF being increased. Moreover, the communication system according to PTL 1 also has the problem that similarly, as the number of access gateways increases, the number of sessions to the selector PCRF server grows, resulting in the load on the selector PCRF server being increased.

Accordingly, an object of the present invention is to provide a charging control method and system that can reduce the processing load on a function performing charging control.

Solution to Problem

According to the present invention, a charging control system in a communication network is characterized by comprising: a charging control means; a plurality of gateways; and a relay means connecting the charging control means and the plurality of gateways in a hierarchical manner.

According to the present invention, a charging control method in a communication network is characterized in that a charging control means and a plurality of gateways are connected via a relay means in a hierarchical manner, and the relay means aggregates information for charging received from the gateways and transfers it to the charging control means.

Advantageous Effects of Invention

According to the present invention, the number of sessions at a charging control function is restricted, whereby it is possible to reduce the processing load on the charging control function.

DETAILED DESCRIPTION OF PREFERRED EMBODIMENTS

According to the present invention, a hierarchical structure is adopted in which connection between a plurality of gateways and a charging control function is made via a relay means, whereby the number of sessions that are directly connected to the charging control function is reduced. Hereinafter, exemplary embodiments of the present invention will be described in detail with reference to drawings.

1. First Exemplary Embodiment

According to a first exemplary embodiment, a policy and charging rules function (PCRF), which is a charging control means, and a plurality of policy and charging enforcement functions (PCEFs), which are means for providing information for charging, are connected via a relay means in a hierarchical manner, wherein the relay means includes a switch and a relay server placed under the switch. The relay server aggregates information on packet counts counted by each PCEF and sends it to the upper-order PCRF. Hereinafter, a charging control system according to the present exemplary embodiment will be described in detail with reference to FIGS. 2 and 3.

Figure 1:
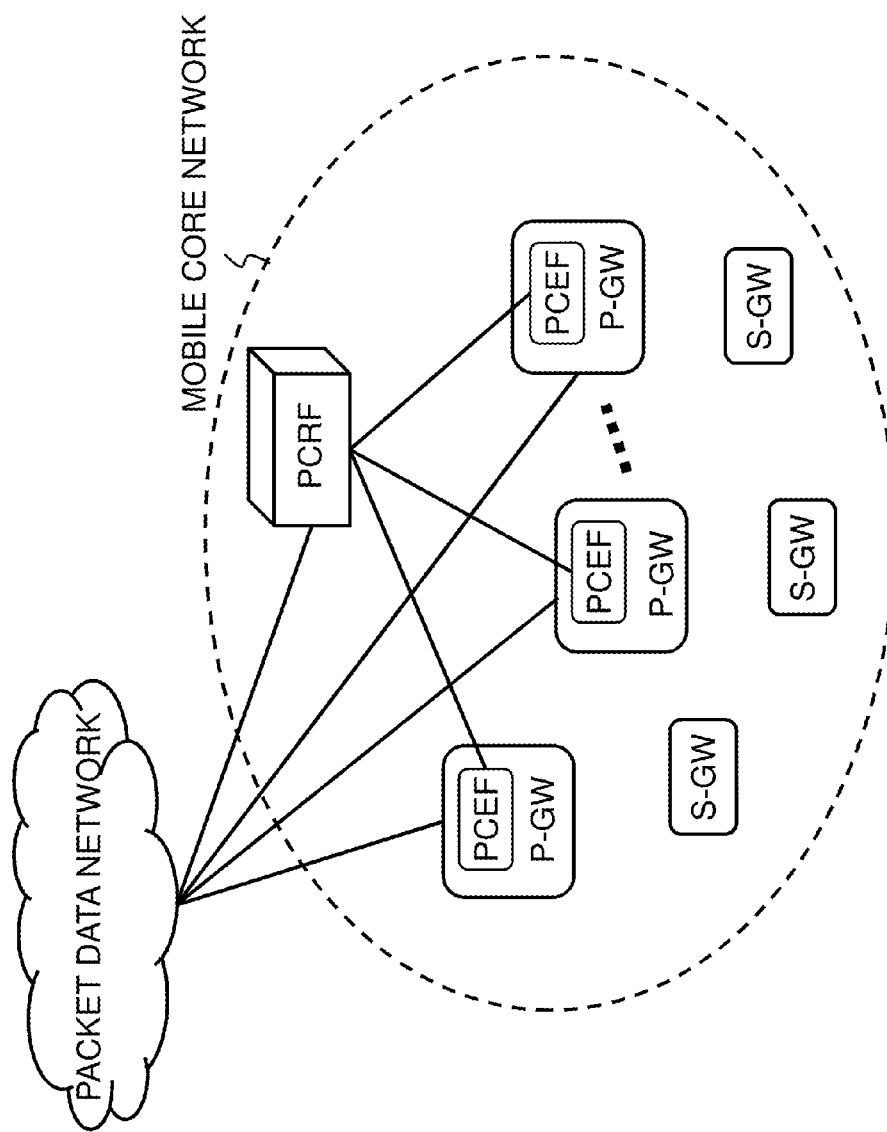
FIG. 1 is a network diagram showing a schematic structure of a mobile core network.
Figure 2:
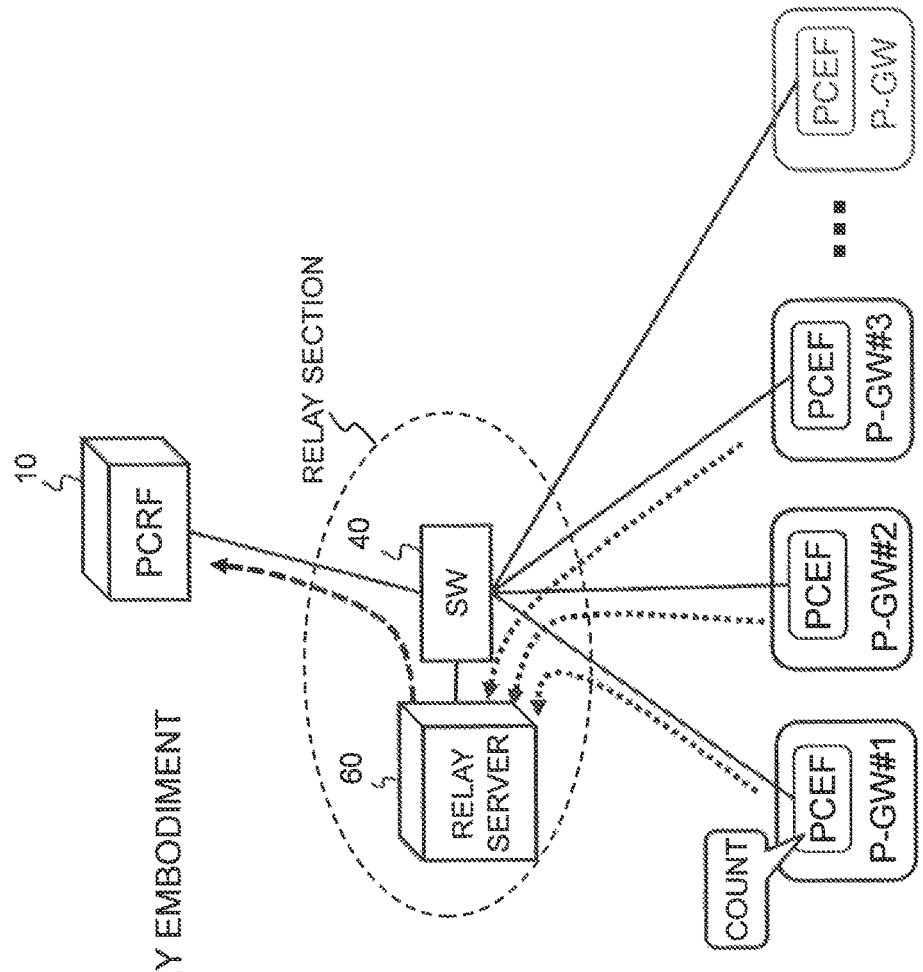
FIG. 2 is a network structure diagram of a charging control system according to a first exemplary embodiment of the present invention.

Referring to FIG. 2, the charging control system according to the present exemplary embodiment includes a policy and charging rules function (PCRF) 10, a relay section consisting of a switch 40 and a relay server 60, and policy and charging enforcement functions (PCEFs) in a plurality of PDN gateways (P-GW #1, P-GW #2, . . . ). The switch 40, which has the relay server 60 and the plurality of PCEFs under itself, transfers information from the plurality of PCEFs to the relay server 60 and transfers aggregated information, aggregated by the relay server 60, to the PCRF 10.

In general, a session is established between a PCRF and a PCEF based on a predetermined protocol. Hereinafter, a description will be given of the establishment of a PCRF-PCEF session in the structure via the relay server 60 as shown in FIG. 2, by illustrating a case as an example where a PCRF-PCEF session is established based on SCTP (Stream Control Transmission Protocol).

Figure 3:
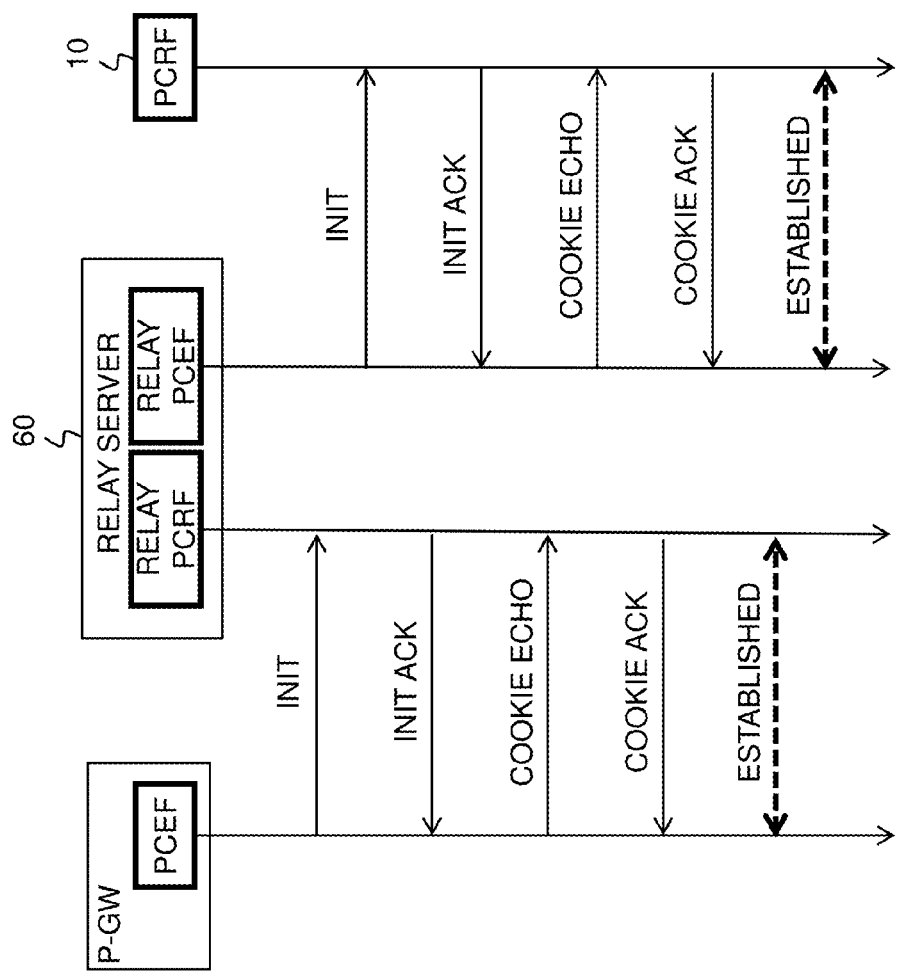
FIG. 3 is a sequence diagram showing an example of a PCEF-PCRF connection procedure via an aggregation relay server in the first exemplary embodiment.

The relay server 60 has a PCRF function equivalent to the PCRF 10 and a PCEF function equivalent to the PCEF. Referring to FIG. 3, the relay server 60 simulates the PCRF function (relay PCRF) for the PCEFs in the P-GWs, and simulates the PCEF function (relay PCEF) for the PCRF 10. A connection is established based on a predetermined protocol between the PCEF in a P-GW and the relay PCRF and between the relay PCEF and the PCRF 10. For the predetermined protocol, for example, SCTP, TCP, or the like can be used. Hereinafter, a description will be given in a case where a connection is established by using SCTP. As shown in FIG. 3, respective sessions are established between the PCEF in a P-GW and the relay PCRF and between the relay PCEF and the PCRF 10 independently of each other, through a SCTP protocol-based connection procedure. Specifically, an INIT packet is sent from the PCEF/relay PCEF to the relay PCRF/PCRF 10, whereby the predetermined procedure is started, and an IP-CAN (Connectivity Access Network) session is established between the PCEF/relay PCEF and the relay PCRF/PCRF 10 respectively.

When the session is established, information on packet counts counted in units of IP flows by the PCEF in a P-GW is transferred to the relay server 60 via the switch 40, and the relay server 60 aggregates the packet count information received from each PCEF and transfers the aggregated information to the PCRF 10 via the switch 40. Accordingly, the number of sessions at the PCRF 10 is not the number of sessions with the plurality of PCEFs, but is reduced to the number of sessions with the relay server 60. As to the aggregation operation at the relay server 60, for example, the relay server 60 may aggregate packets received from each PCEF and send them as they are to the PCRF 10, or may extract data of packets received from each PCEF, generate a new packet by adding count information, and send it to the PCRF 10.

As described above, the PCRF 10 and the plurality of PCEFs are connected hierarchically via the switch, under which the relay server is placed, whereby it is possible to reduce the number of sessions at the PCRF 10, without making a change to the PCRF 10 or the PCEFs in the P-GWs.

Note that the relay server 60 is not only externally attached to the switch 40, but also may be incorporated in the switch 40. Moreover, for the switch 40, an OpenFlow switch may also be used.

2. Second Exemplary Embodiment

According to a second exemplary embodiment of the present invention, a policy and charging rules function (PCRF), which is a charging control means, and a plurality of policy and charging enforcement functions (PCEFs) are connected via a switch in a hierarchical manner, and the number of packets are counted by using a packet count function of the switch, which is a means for providing information for charging. Packet count information is transferred to a controller, where the packet count information is aggregated, and the aggregated information is sent to the PCRF. Hereinafter, a charging control system according to the present exemplary embodiment will be described in detail with reference to FIG. 4.

Figure 4:
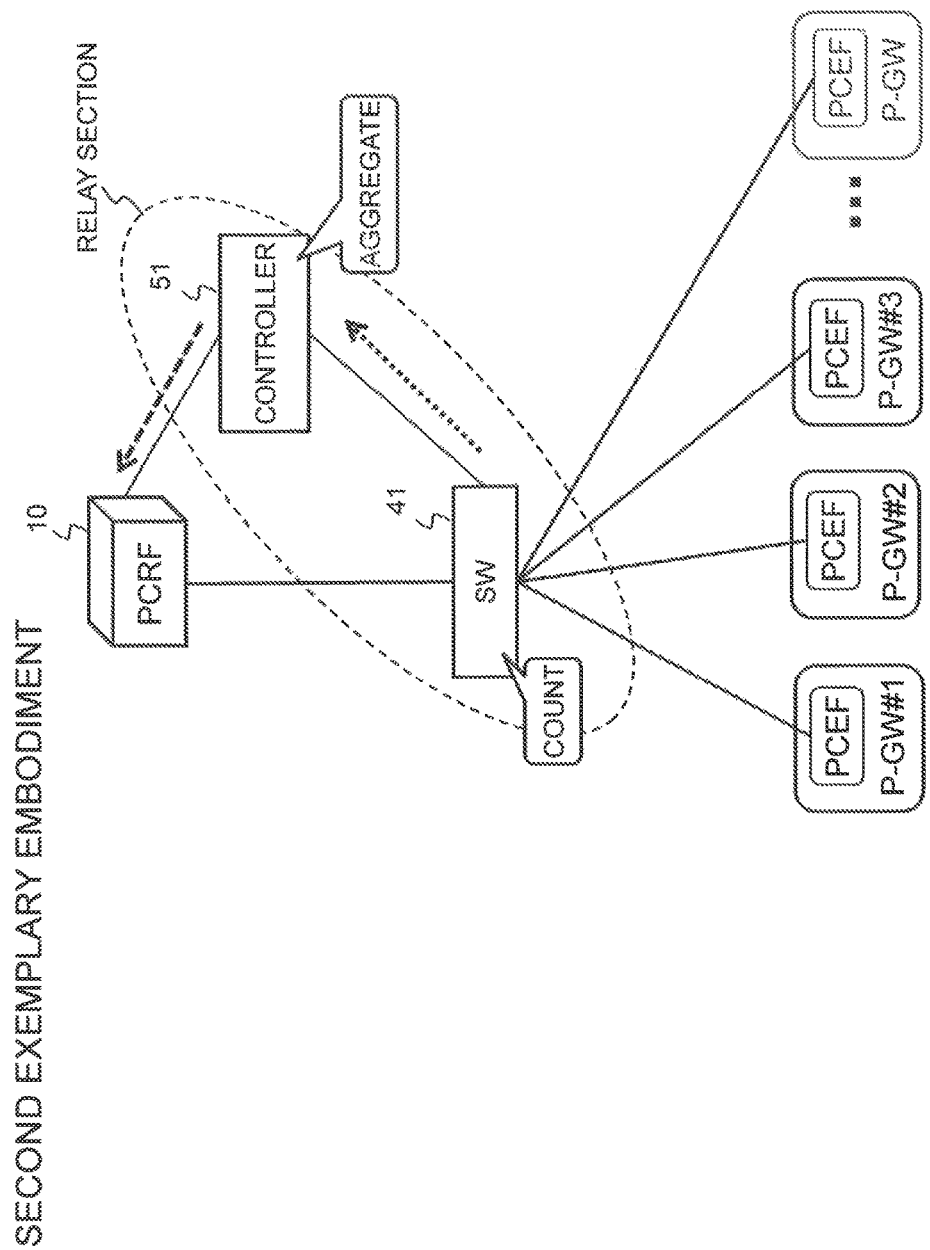
FIG. 4 is a network structure diagram of a charging control system according to a second exemplary embodiment of the present invention.

Referring to FIG. 4, the charging control system according to the present exemplary embodiment includes a PCRF 10, a relay section consisting of a switch 41 and a controller 51 connected to the switch 41, and PCEFs in a plurality of PDN gateways (P-GW #1, P-GW #2, . . . ). The same functional sections as those of the system of FIG. 2 are denoted by the same reference signs, and a description thereof will be omitted. The switch 41 in the present exemplary embodiment has a packet count function and sends packet count information to the controller 51. The controller 51 has an aggregation function and sends aggregated information to the selected PCRF 10. The aggregation function is similar to the aggregation function of the relay server 60 in the first exemplary embodiment.

Figure 5:
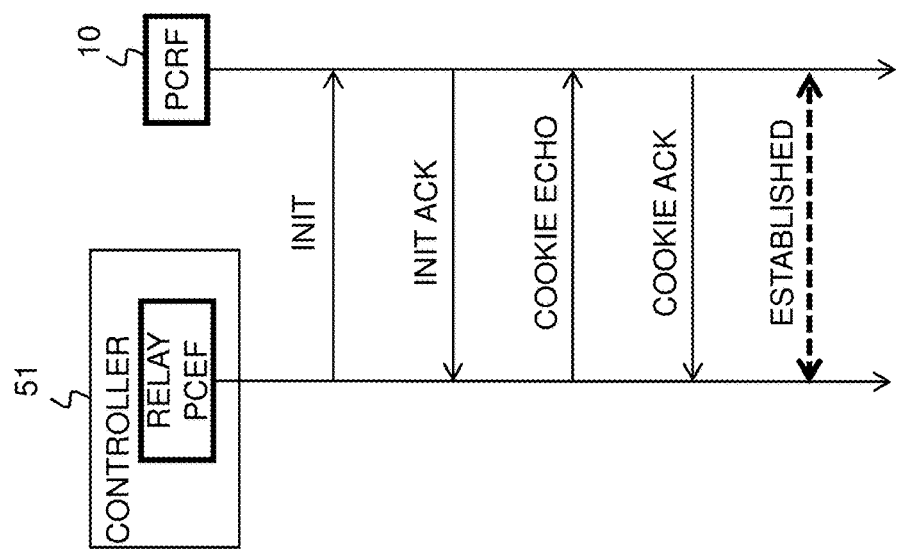
FIG. 5 is a sequence diagram showing an example of a relay PCEF-PCRF connection procedure in the second exemplary embodiment.

Referring to FIG. 5, the controller 51 simulates a PCEF function (relay PCEF) for the PCRF 10. A session is established between the relay PCEF and the PCRF 10 through a SCTP protocol-based connection procedure. Specifically, an INIT packet is sent from the relay PCEF to the PCRF 10, whereby the predetermined procedure is started, and an IP-CAN (Connectivity Access Network) session is established between the relay PCEF and the PCRF 10. Note that the packet count information obtained by the packet count function of the switch 41 is sent and received over a control channel with the controller 51. In addition, the PCEF in each P-GW is not involved in charging control.

As described above, the PCRF 10 and the plurality of PCEFs are connected hierarchically via the switch 41 having the packet count function and the controller 51 having the aggregation function, whereby it is possible to reduce the number of sessions at the PCRF 10, without making a change to the PCRF or the PCEFs. Note that for the switch 41 and the controller 51, an OpenFlow switch and an OpenFlow switch controller may be used. If OpenFlow ones are used for the switch 41 and the controller 51, the packet count function of the switch 41 can count packets in units of flows.

3. Third Exemplary Embodiment

According to a third exemplary embodiment of the present invention, a policy and charging rules function (PCRF), which is a charging control means, and a plurality of policy and charging enforcement functions (PCEFs) are connected via a switch in a hierarchical manner, and the number of packets are counted by using a packet count function of a virtual switch (vSW) provided to a P-GW as a means for providing information for charging. Packet count information is transferred to a controller via the switch and aggregated, and the aggregated information is sent to the PCRF.

Hereinafter, a charging control system according to the present exemplary embodiment will be described in detail with reference to FIG. 6.

Figure 6:
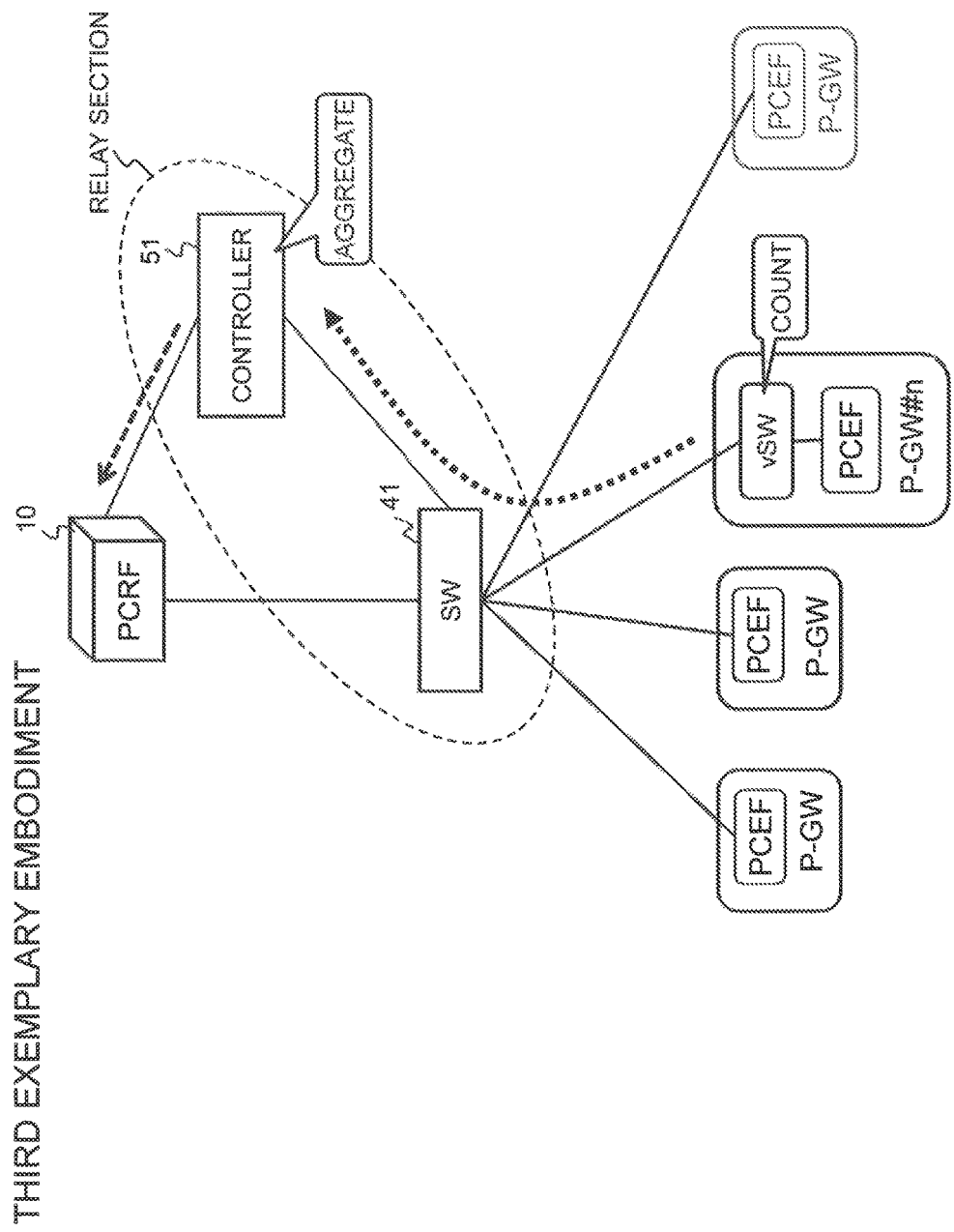
FIG. 6 is a network structure diagram of a charging control system according to a third exemplary embodiment of the present invention.

Referring to FIG. 6, the charging control system according to the present exemplary embodiment includes a PCRF 10, a relay section consisting of a switch 41 and a controller 51 connected to the switch 41, PCEFs in a plurality of PDN gateways (P-GW #1, P-GW #2, . . . ), a PCRF, and a virtual switch vSW in a PDN gateway (P-GW #n). The same functional sections as those of the system of FIG. 4 are denoted by the same reference signs, and a description thereof will be omitted. The PDN gateway P-GW #n in the present exemplary embodiment includes the virtual switch vSW having a flow-unit packet count function and sends packet count information to the controller 51 via the switch 41. The controller 51 has an aggregation function and sends aggregated information to the selected PCRF 10. The aggregation function is similar to the aggregation function of the relay server 60 in the first exemplary embodiment.

As described above, the number of sessions at the PCRF 10 can be reduced as in the second exemplary embodiment by using the packet count function of the virtual switch vSW in the PDN gateway (P-GW #n). Note that for the switch 41 and the controller 51, an OpenFlow switch and an OpenFlow switch controller may also be used.

4. Fourth Exemplary Embodiment

A PDN gateway P-GW including a PCEF is not only one in a mobile core network but also may be a PDN gateway provided to a base station. Hereinafter, a PDN gateway P-GW for offload (hereinafter, referred to as PO-GW) in a base station that supports a traffic offload function (see 3GPP TR23.829 v10.0.0 (2011-03) and 3GPP TS23.401 v10.0.0 (2010-06)) called LIPA (Local IP Access) or SIPTO (Selected IP Traffic Offload) will be shown as an example.

According to a fourth exemplary embodiment of the present invention, it is also possible to apply a charging control system similar to those described in the first to third exemplary embodiments to such a PCEF in a PO-GW in a base station. Hereinafter, the charging control system according to the present exemplary embodiment will be described in detail with reference to FIG. 7.

Figure 7:
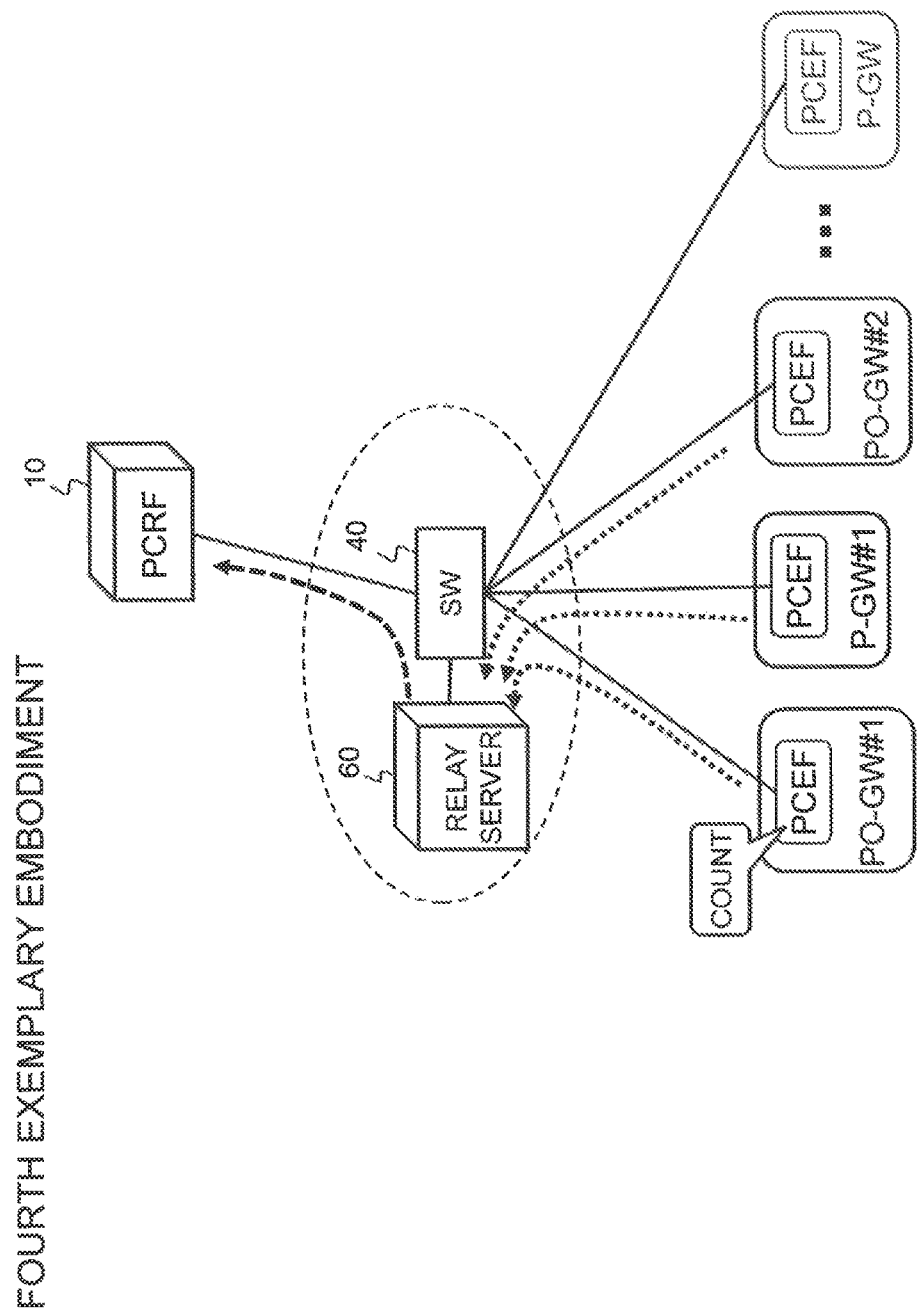
FIG. 7 is a network structure diagram of a charging control system according to a fourth exemplary embodiment of the present invention.

FIG. 7 shows a system structure in a case where the P-GWs in the above-described system of the first exemplary embodiment and PO-GWs coexist. The same functions as in FIG. 2 are denoted by the same reference signs as in FIG. 2, and a description thereof will be omitted. With respect to the PCEFs in such PO-GWs #1 and #2, as in the case of the P-GWs, the switch 40 transfers packet count information from each of the PCEFs of the PO-GW #1, P-GW #1, and PO-GW #2 to the relay server 60 and transfers aggregated information from the relay server 60 to the PCRF 10.

Accordingly, as in the first exemplary embodiment, the PCRF 10 and the plurality of PCEFs are connected via the switch 40 in a hierarchical manner, and the relay server 60 is placed under the switch 40, whereby it is possible to reduce the number of sessions at the PCRF 10, without making a change to the PCRF or the PCEFs. For the PO-GWs, the second and third exemplary embodiments can be similarly applied, and similar effects can be obtained.

Since a base station including a PO-GW is provided on the user side, there is a possibility that the number of PCEFs increases rapidly with the proliferation of PO-GWs. In such circumstances, according to the present exemplary embodiment, it is possible to reduce the number of sessions directly connected to a PCRF.

Hereinafter, a method of accessing a PO-GW in the present exemplary embodiment will be described with reference to drawings, where individual functions will be represented by the following signs.

UE: User Equipment (mobile terminal)
eNB: eNodeB (base station)
PO-GW: Packet Offload Gateway (gateway for packet offload)
PFS: Programmable Flow Switch (switch)
S-GW: Serving Gateway (gateway for its serving area)
P-GW: Packet data network Gateway (PDN gateway)
MME: Mobility Management Entity (mobility management function)
DNS: Domain Name System (name resolution system)
HSS: Home Subscriber Server (subscriber information management server)
APN: Access Point Name (access point name)

4.1) System Structure

Figure 8:
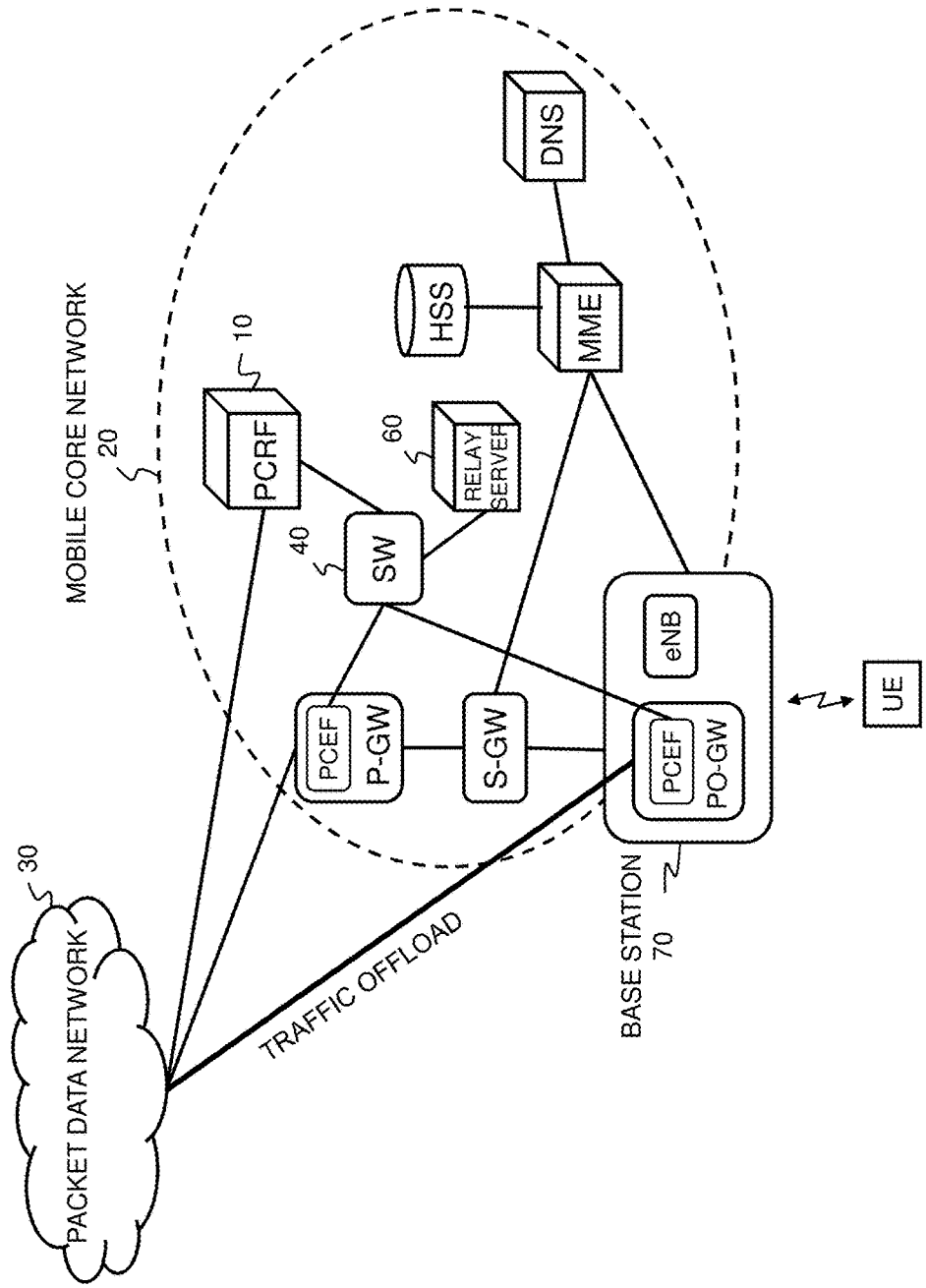
FIG. 8 is a network diagram showing a schematic structure of a mobile core network to which the charging control system according to the fourth exemplary embodiment is applied.

Referring to FIG. 8, a system according to the present exemplary embodiment includes a base station 70, a mobile core network 20, and a mobile terminal UE, and the base station 70 and the mobile core network 20 can connect to an external packet data network 30. The base station 70 has a PO-GW function and an eNB function, which will be described later, and the mobile core network 20 includes a S-GW, a P-GW, a MME, a DNS, a HSS, a switch 40, and a PCRF 10. The mobile terminal UE can connect to the external packet data network 30 via the P-GW of the mobile core network 20 but also can directly connect to the external packet data network 30 via the PO-GW of the base station 70 by changing operations on the network side, which will be described later. In any case, charging control is performed by a PCEF of the P-GW/PO-GW and the PCRF 10. Hereinafter, the Internet will be used as an example of the external packet data network.

Figure 9:
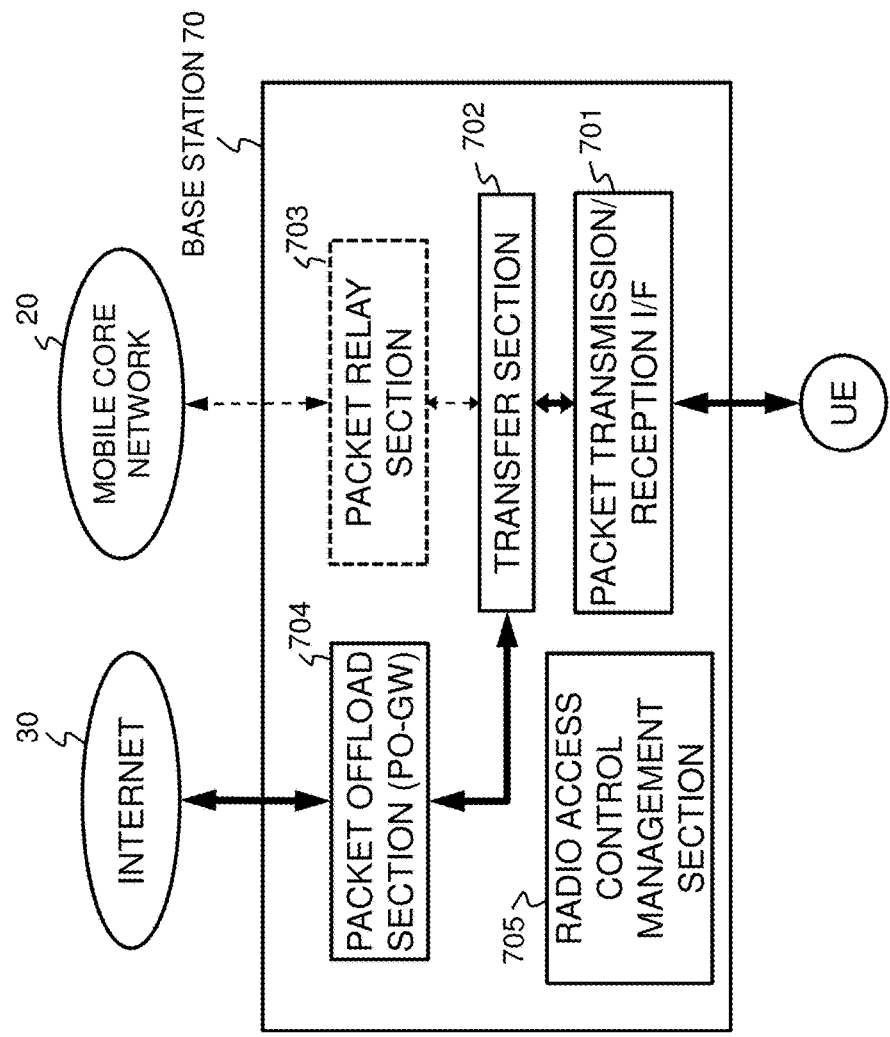
FIG. 9 is a block diagram showing a functional configuration of a base station used in the fourth exemplary embodiment.

FIG. 9 shows a partial functional configuration of the base station 70. The base station 70 includes a packet transmission/reception interface 701 that performs packet communication with the mobile terminal UE, a transfer section 702 that changes packet data paths at the time of packet offload, a packet relay section 703 that transmits and receives packets to/from the mobile core network 20, a packet offload section 704, and a radio access control management section 705. The eNB function of the base station 70 is implemented by the packet transmission/reception interface 701, the packet relay section 703, and the radio access control management section 705, while the PO-GW function is implemented by the transfer section 702 and the packet offload section 704. Note that the base station 70 is provided with a control section (not shown), which controls the entire operation of the base station.

The packet offload section 704 corresponds to the PO-GW, and the transfer section 702 transfers packet data to the packet offload section 704 at the time of offload, whereby traffic is flown to the Internet 30 and a reduction in the load on the mobile core network 20 is achieved. Note that the transfer section 702 and the packet offload section 704 are controlled by using control signals from the mobile core network 20, as shown in FIG. 9. It is assumed here that the fact that the base station 70 has the PO-GW function is known to the network side beforehand.

4.2) PDN Bearer Connection Control

Figure 10:
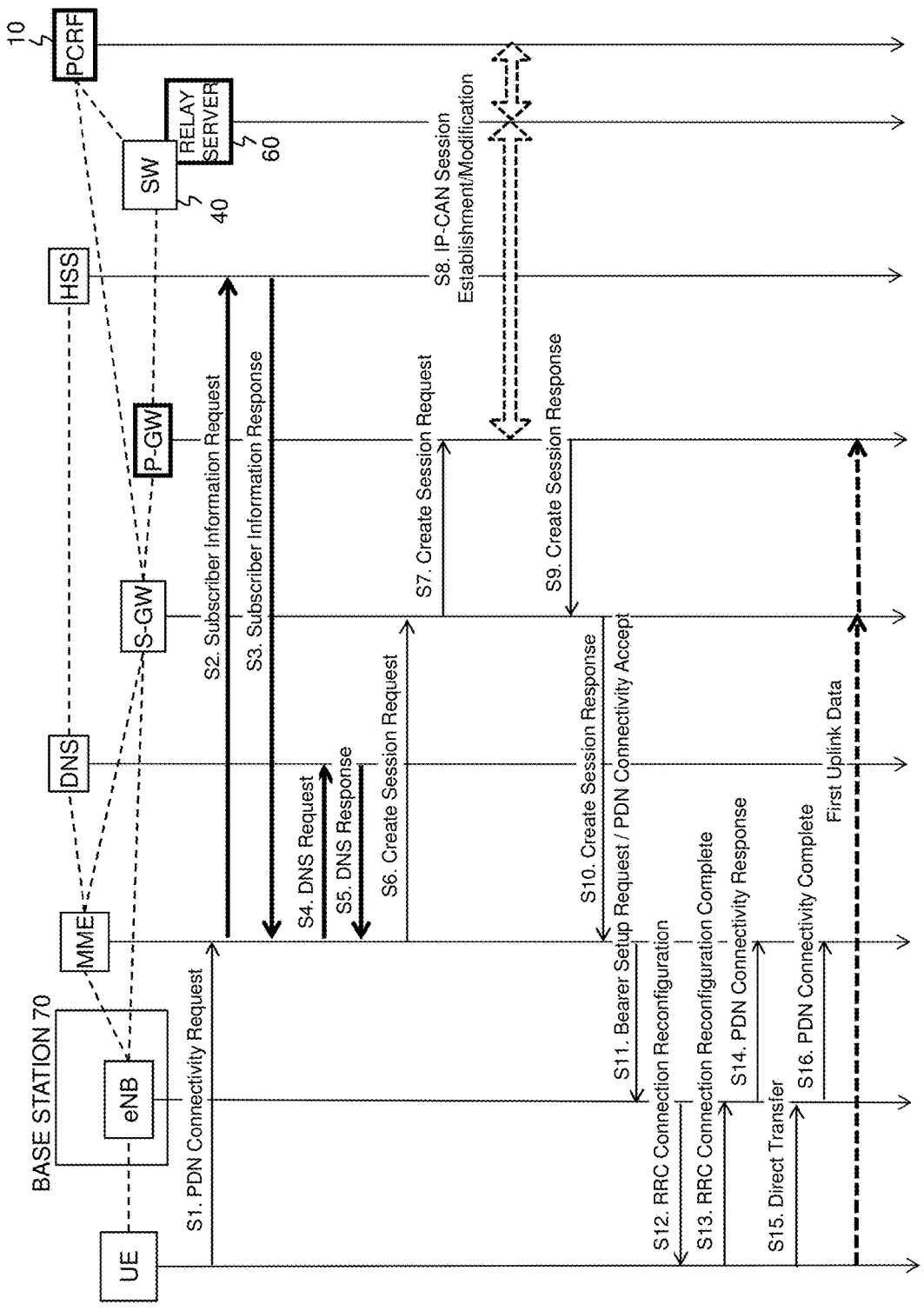
FIG. 10 is a sequence diagram showing PDN bearer connection control via the mobile core network in the fourth exemplary embodiment.
Figure 11:
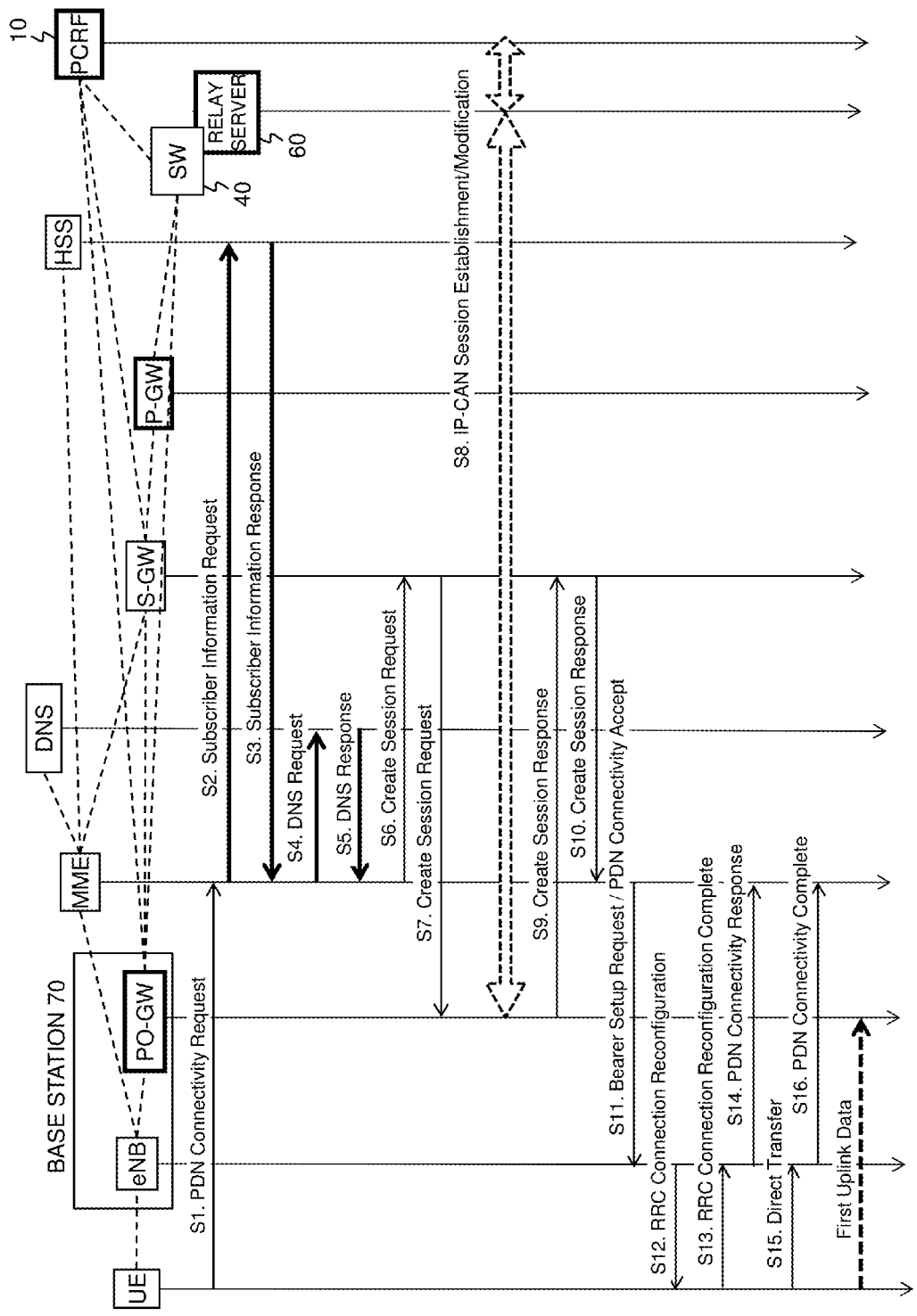
FIG. 11 is a sequence diagram showing PDN bearer connection control at the time of traffic offload in the fourth exemplary embodiment.

Next, an outline of control according to the present exemplary embodiment will be described with reference to PDN bearer connection control sequences shown in FIGS. 10 and 11. FIG. 10 shows a PDN bearer connection control sequence in an existing LTE network, and FIG. 11 shows a PDN bearer connection control sequence at the time of offload, wherein a connection between the mobile terminal UE and the Internet 30 is achieved via the P-GW of the mobile core network 20 and via the PO-GW of the base station 70, respectively. In terms of the operation of the base station, when the mobile terminal UE has accessed the PO-GW in according with control by the mobile core network 20, the transfer section 702 of the base station 70 changes packet data paths from the packet relay section 703 to the packet offload section 704. However, respective operational steps of the PDN bearer connection control sequences in FIGS. 10 and 11 are different only in terms of P-GW or PO-GW and therefore are denoted by the same operation numbers S1 to S16.

In the PDN bearer connection control in the existing LTE shown in FIG. 10, first, the MME, upon receiving a PDN connectivity request message (PDN Connectivity Request) from the mobile terminal UE via the base station 70 (operation S1), sends a subscriber information request message (Subscriber Information Request) to the HSS (operation S2). Upon receiving a response message (Subscriber Information Response) thereto from the HSS (operation S3), the MME sends a DNS request message (DNS Request) to the DNS attached to itself (operation S4) and receives a response message (DNS Response) thereto (operation S5). In FIG. 10, the IP addresses of the S-GW and the P-GW, the targets with which a bearer is set, are selected.

Subsequently, the MME sends a session creation request message (Create Session Request) to the selected S-GW (operation S6), and the S-GW sends a session creation request message (Create Session Request) to the selected P-GW (operation S7). When IP-CAN sessions are established between the PCEF of the P-GW and the relay PCRF of the relay server 60 and between the relay PCEF of the relay server 60 and the PCRF 10, respectively (operation S8), a session creation response message (Create Session Response) is returned to the S-GW (operation S9).

Figure 12:
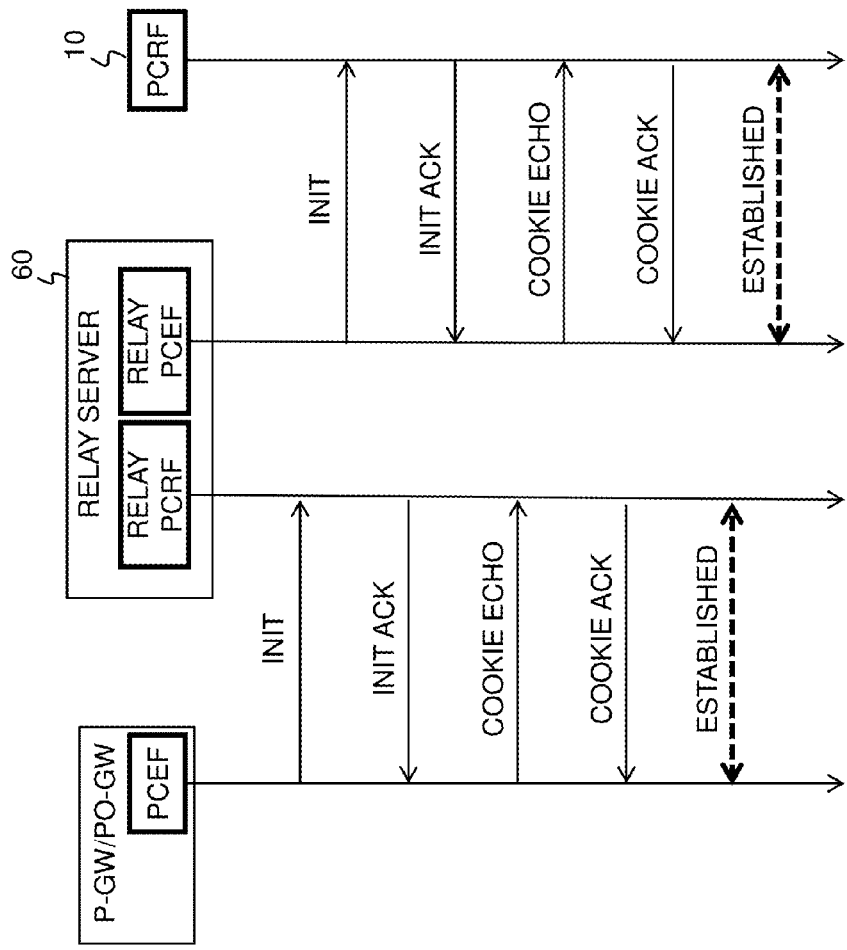
FIG. 12 is a sequence diagram showing an example of a PCEF-PCRF connection procedure via a relay server in the fourth exemplary embodiment.

Note that the IP-CAN sessions between the PCEF of the P-GW and the relay PCRF of the relay server 60 and between the relay PCEF of the relay server 60 and the PCRF 10 are established based on SCTP protocol as shown in FIG. 12, which is substantially the same as in the first exemplary embodiment shown in FIG. 3, and therefore a description thereof will be omitted.

Subsequently, the S-GW returns Create Session Response to the MME (operation S10). The MME, upon receiving the Create Session Response from the S-GW, sends a radio bearer setup request/PDN connectivity request acceptance message (Bearer Setup Request/PDN Connectivity Accept) to the eNB of the base station 70 (operation S11). Upon receiving the Bearer Setup Request/PDN Connectivity Accept, the eNB of the base station 70 sends a RRC connection reconfiguration message (RRC Connection Reconfiguration) to the mobile terminal UE (operation S12). The eNB, upon receiving a RRC connection reconfiguration completion message (RRC Connection Reconfiguration Complete) as a response thereto (operation S13), sends a PDN connectivity response message (PDN Connectivity Response) to the MME (operation S14). Further, the mobile terminal UE sends a direct transfer message (Direct Transfer) containing a PDN connectivity completion message (PDN Connectivity Complete) to the eNB (operation S15), and the eNB sends PDN Connectivity Complete to the MME (operation S16). In this manner, bearer setup from the mobile terminal UE to the P-GW via the eNB and the S-GW is completed. The then transfer section 702 of the base station 70 transfers packets between the packet transmission/reception interface 701 and the packet relay section 703.

Thus, the PCEF of the P-GW in the mobile core network 20 establishes a connection with the PCRF 10 via the relay PCRF and relay PCEF of the relay server 60, and charging control based on packet count information is performed as described in the first exemplary embodiment.

On the other hand, in the PDN bearer connection control at the time of offload in FIG. 11, the MME, upon receiving a PDN connectivity request message (PDN Connectivity Request) from the mobile terminal UE via the base station 70 (operation S1), sends a subscriber information request message (Subscriber Information Request) to the HSS (operation S2). Upon receiving a response message (Subscriber Information Response) thereto from the HSS (operation S3), the MME sends a DNS request message (DNS Request) to the DNS attached to itself (operation S4) and receives a response message (DNS Response) thereto (operation S5). In FIG. 11, the IP addresses of the S-GW and the PO-GW, the targets with which a bearer is set, are selected.

Subsequently, the MME sends a session creation request message (Create Session Request) to the selected S-GW (operation S6), and the S-GW sends a session creation request message (Create Session Request) to the selected PO-GW (base station 70) (operation S7). When IP-CAN sessions are established between the PCEF of the PO-GW and the relay PCRF of the relay server 60 and between the relay PCEF of the relay server 60 and the PCRF 10, respectively (operation S8), a session creation response message (Create Session Response) is returned to the S-GW (operation S9).

Note that the IP-CAN sessions between the PCEF of the PO-GW and the relay PCRF of the relay server 60 and between the relay PCEF of the relay server 60 and the PCRF 10 are established based on SCTP protocol as shown in FIG. 12, which is substantially the same as in the first exemplary embodiment shown in FIG. 3, and therefore a description thereof will be omitted.

Subsequently, the S-GW returns Create Session Response to the MME (operation S10). The MME, upon receiving the Create Session Response from the S-GW, sends a radio bearer setup request/PDN connectivity request acceptance message (Bearer Setup Request/PDN Connectivity Accept) to the eNB of the base station 70 (operation S11). Upon receiving the Bearer Setup Request/PDN Connectivity Accept, the eNB of the base station 70 sends a RRC connection reconfiguration message (RRC Connection Reconfiguration) to the mobile terminal UE (operation S12). The eNB, upon receiving a RRC connection reconfiguration completion message (RRC Connection Reconfiguration Complete) as a response thereto (operation S13), sends a PDN connectivity response message (PDN Connectivity Response) to the MME (operation S14). Further, the mobile terminal UE sends a direct transfer message (Direct Transfer) containing a PDN connectivity completion message (PDN Connectivity Complete) to the eNB (operation S15), and the eNB sends PDN Connectivity Complete to the MME (operation S16). In this manner, bearer setup from the mobile terminal UE to the PO-GW via the eNB is completed. The then transfer section 702 of the base station 70 transfers packets between the packet transmission/reception interface 701 and the packet offload section 704.

Thus, the PCEF of the PO-GW in the base station 70 established a connection with the PCRF 10 via the relay PCRF and relay PCEF of the relay server 60, and charging control based on packet count information is performed as described in the first exemplary embodiment.

4.3) Methods for Implementing Offload

According to the present exemplary embodiment, to implement the traffic offload shown in FIG. 11, it is sufficient to set an IP address that will ultimately serve as a PDN gateway for the PO-GW at any one of the operations S2 to S5 in the PDN bearer connection control sequence. This offload can be implemented by the following three methods, for example.

Offload method A: For a function of the DNS, a function is added of returning to the MME an IP address to serve as a PDN gateway (P-GW or PO-GW), based on the identification information ID of a base station to which the mobile terminal UE has requested to attach.

Offload method B: For a function of the MME, a function is added of determining a PDN gateway to connect to, based on attribute information indicative of a base station with PO-GW and on location information. For example, the MME selects the IP address of the P-GW/PO-GW, based on information such as attribute information and location information, from an address list of P-GW and PO-GW received from the DNS at the operation S5 in the sequences shown in FIGS. 10 and 11.

Offload method C: For a function of the HSS, a function is added of changing information about a PDN gateway to connect to, based on attribute information indicative of a base station with PO-GW. For example, at the time of inquiring of the HSS at the operation S2 in the sequences FIGS. 10 and 11, the HSS receives attribute information from the MME and returns to the MME a response in which a default PDN is set for the IP/APN of the P-GW/PO-GW.

INDUSTRIAL APPLICABILITY

The present invention is applicable to a charging control system of a mobile core network.

REFERENCE SIGNS LIST

10 PCRF (policy and charging rules function)
20 Mobile core network
30 Packet data network
40 Switch
41 Switch
50 Controller
51 Controller with aggregation function
60 Relay server
70 Base station

The invention claimed is:

1. A charging control system in a communication network, comprising:
   a charging controller;
   a plurality of gateways; and
   a relay connecting the charging controller and the plurality of gateways in a hierarchical manner, wherein the relay is configured to establish a charging control session with each of the plurality of gateways.

2. The charging control system according to claim 1, wherein the charging controller is directly connected to the relay.

3. The charging control system according to claim 1, wherein the relay is configured to aggregate information for charging received from the gateways and to transfer the aggregated information to the charging controller.

4. The charging control system according to claim 1, wherein the relay includes a switch connected to the charging controller and to the plurality of gateways, and further includes a relay server connected to the switch.

5. The charging control system according to claim 4, wherein:
   the plurality of gateways are configured to provision a charging information, and
   the relay server aggregates the charging information provisioned by the plurality of gateways and transfers the aggregated information to the charging controller.

6. The charging control system according to claim 1, wherein the relay includes a switch connected to the charging controller and to the plurality of gateways, and includes a relay controller connected to the switch.

7. The charging control system according to claim 6, wherein:
   the switch is configured to provide information for charging received from the plurality of gateways, and
   the controller is configured to aggregate the information for charging and to transfer the aggregated information to the charging controller.

8. The charging control system according to claim 6, wherein:
   the plurality of gateways are configured to provision charging information, and
   the controller is further configured to aggregate the charging information provisioned by the plurality of gateways and to transfer the aggregated information to the charging controller.

9. The charging control system according to claim 1, wherein the gateway is associated with a base station in the communication network.

10. A charging control method in a communication network:
    connecting a charging contoller and a plurality of gateways via a relay in a hierarchical manner, and
    aggregating, by the relay, information for charging received from the plurality of gateways; and
    transferring the aggregated information to the charging controller,
    establishing, by the relay, a charging control session with each of the plurality of gateways.

11. The charging control method according to claim 10, wherein the charging controller is connected to the relay with session establishment.

12. The charging control method according to claim 10, wherein:
    the relay includes a switch connected to the charging controller and to the plurality of gateways and includes a relay server connected to the switch, and
    the method further includes aggregating, by the relay server, information for charging provisioned by the plurality of gateways and transfers the aggregated information to the charging controller.

13. The charging control method according to claim 10, wherein:
    the relay includes a switch connected to the charging controller and to the plurality of gateways and includes a switch controller connected to the switch,
    wherein the method further includes:
    providing, by the switch to the controller, information for charging received the plurality of gateways;
    aggregating, by the controller, the provided information for charging; and
    transferring the aggregated information to the charging controller.

14. The charging control method according to claim 10, wherein:

the plurality of gateways provision the charging information, and aggregating, by the controller, the charging information provisioned by the plurality of gateways, and transferring the aggregated information to the charging controller control.

15. A relay server in a charging control system on a communication network, the relay server comprising:

an interface, to a switch that connects a charging controller and a plurality of gateways in a hierarchical manner;

a terminal for establishing a charging control session with each of the plurality of gateways; and a controller that is configured to:

establish a charging control session with each of the plurality of gateways;

aggregate information for charging received from the plurality of gateways; and transfer the aggregated information to the charging controller via the switch.

16. A control device in a charging control system of a communication network, the control device comprising:

an interface to a switch that connects a charging controller and a plurality of gateways in a hierarchical manner; and a controller that is configured to:

establish a charging control session with each of the plurality of gateways, aggregate information for charging received from the plurality of gateways through the switch, and transmit the aggregated information to the charging controller.

17. A base station in a charging control system of a communication network, the base station comprising:

a gateway that is configured to provide information for charging; and one or more processors configured to implement a transfer section that transfers the information for charging to a relay, wherein:

the relay is configured to:

connect a charging controller and a plurality of gateways in a hierarchical manner in the communication network; and establish a charging control session with each of the plurality of gateways.

* * * * *